United States Patent [19]

Franz

[11] 4,065,626
[45] Dec. 27, 1977

[54] GOLD-APPEARING FILMS OF COPPER, NICKEL AND COPPER OXIDE LAYERS

[75] Inventor: Helmut Franz, Pittsburgh, Pa.

[73] Assignee: PPG Industries, Inc., Pittsburgh, Pa.

[21] Appl. No.: 628,704

[22] Filed: Nov. 4, 1975

Related U.S. Application Data

[60] Continuation-in-part of Ser. No. 470,768, May 17, 1974, Pat. No. 3,944,440, which is a division of Ser. No. 252,803, May 12, 1972, Pat. No. 3,846,152.

[51] Int. Cl.² .................. B05D 3/02; B05D 3/10; B05D 5/06; G02B 27/10
[52] U.S. Cl. ...................... 428/629; 148/6.3; 350/166; 427/164; 427/165; 427/169; 427/305; 427/383 A; 427/383 B; 428/433; 428/469; 428/630; 428/675; 428/680
[58] Field of Search ............ 148/6.14 R, 13.2, 14, 148/6.3; 252/407; 350/1, 164, 166, 165, 167; 427/305, 383 B, 169, 383 A, 166, 168; 428/432, 433, 469, 471

[56] References Cited
U.S. PATENT DOCUMENTS

| | | | |
|---|---|---|---|
| 2,501,563 | 3/1950 | Colbert et al. | 148/6.3 X |
| 3,076,727 | 2/1963 | Harwig | 428/432 |
| 3,102,048 | 8/1963 | Gran et al. | 29/183.5 X |
| 3,257,215 | 6/1966 | Schneble | 427/305 X |
| 3,361,580 | 2/1968 | Schneble | 427/305 X |
| 3,382,087 | 5/1968 | Ostrowski | 428/433 X |
| 3,410,710 | 11/1968 | Mochel | 427/160 |
| 3,421,937 | 1/1969 | Rheinburger et al. | 427/404 X |
| 3,537,944 | 11/1970 | Grubb et al. | 428/432 |
| 3,694,337 | 9/1972 | Kushihashi et al. | 428/433 X |

*Primary Examiner*—Ralph S. Kendall
*Assistant Examiner*—R. Eugene Varndell, Jr.
*Attorney, Agent, or Firm*—E. Kears Pollock; Donna L. Seidel

[57] ABSTRACT

Metal/metal oxide coated articles having selective reflectance and transmittance of radiation over an extended spectral range are provided by a combination of at least three coating layers: one being substantially copper, one being substantially copper oxide and one being substantially nickel disposed between the copper coating layer and the copper oxide coating. Chemical or electroless plating techniques are disclosed for the production of such articles.

6 Claims, 3 Drawing Figures

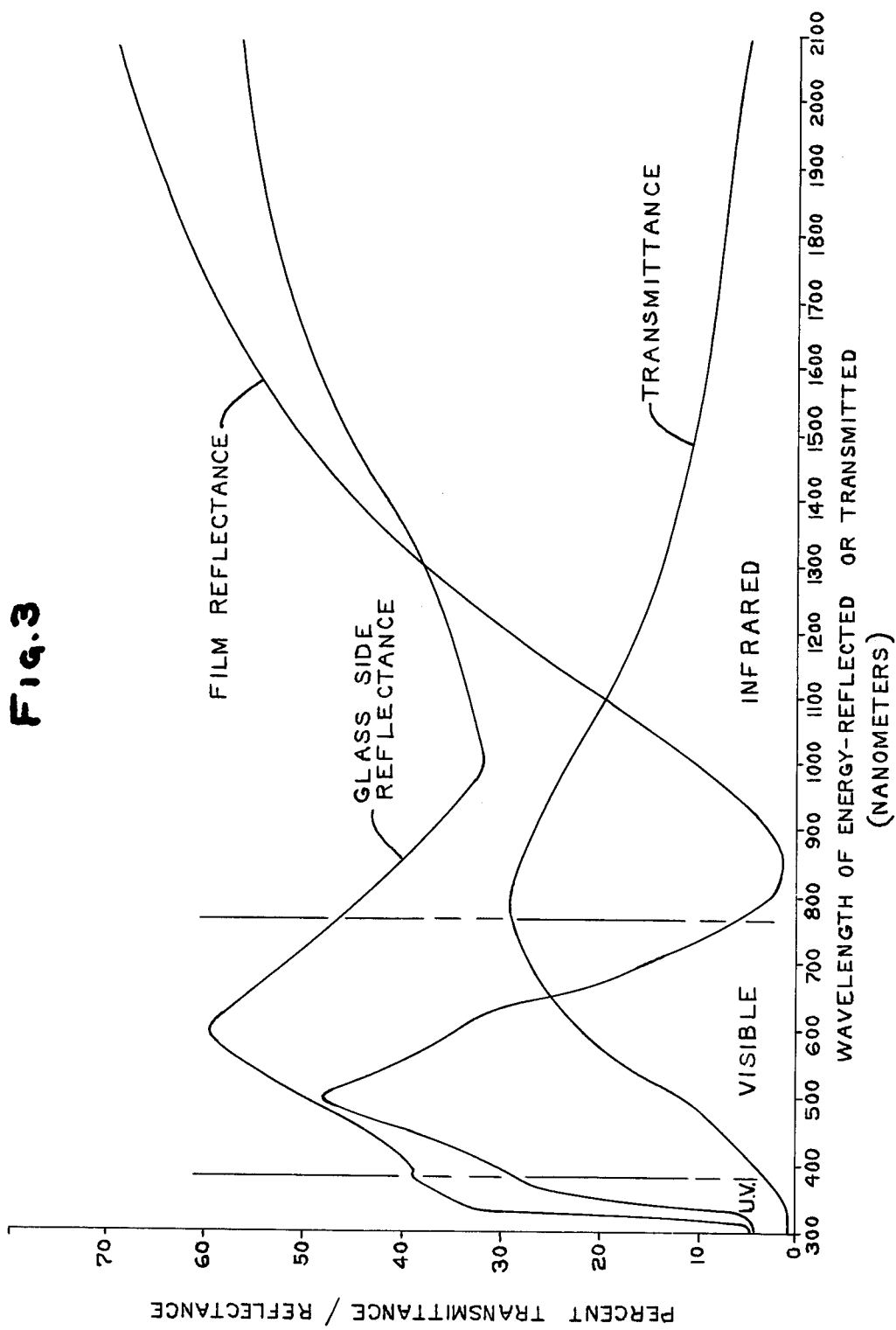

GOLD-APPEARING FILMS OF COPPER, NICKEL AND COPPER OXIDE LAYERS

CROSS-REFERENCE TO RELATED APPLICATIONS

This application is a continuation-in-part of the applicant's copending application Ser. No. 470,768, "Selective Reflecting Metal/Metal Oxide Coatings Using Surfactant to Promote Uniform Oxidation," filed May 17, 1974, now U.S. Pat. No. 3,944,440 issued Mar. 16, 1977, which is a Division of his commonly assigned application Ser. No. 252,803, "Selective Reflecting Metal/Metal Oxide Coatings," filed May 12, 1972 and now U.S. Pat. No. 3,846,152 issued Nov. 5, 1974.

BACKGROUND OF THE INVENTION

This invention relates to multiple coated articles exhibiting selective reflectance and transmittance of radiation over an extended spectral range, and more particularly relates to visibly transparent articles having such selective reflectance. In another embodiment, this invention relates to an electroless coating method for producing such articles.

In the past, multiple layer coatings have been employed which provide particular reflectance and transmittance characteristics for the composite film. Exemplary of this prior art is the basic work of G. L. Dimmick, for example, U.S. Pat. Nos. 2,379,790, 2,412,496, 2,422,954 and 2,624,238. Particular coating materials employed in the prior art and disclosed in these references are a relatively high-index refraction material selected from lead molybdate, lead tungstate, lead chromate, titanium dioxide, magnesium oxide, lead oxide, bismuth oxide and preferably zinc sulfide and a low index of refraction material selected from magnesium fluoride, calcium fluoride, calcium silicate, lithium fluoride, aluminum fluoride, aluminum oxide and preferably thorium oxyfluoride (cryolite). In the application of such layers according to the prior art, it is necessary to employ vaporization techniques or other techniques requiring a vacuum. The techniques of this prior art are not particularly effective for the production of coatings on large substrates, such as those intended for viewing closures in buildings or vehicles.

Other workers in the art have modified the basic concepts of Dimmick to include metal films or foil and semimetal films in combination with the particular high index of refraction materials taught by Dimmick. Exemplary of disclosures relating to these modifications is U.S. Pat. No. 3,516,720 which discloses the use of two metal films in combination with layers of high index of refraction material according to Dimmick where the particular metal films are a nickel film and a gold or copper film separated by a layer of zinc sulfide. As with the articles and techniques of Dimmick, the preparation of these combination films or coatings are practically limited to their preparation on small substrates such as the sunglasses which are prepared according to this reference.

In the preparation of transparent, reflective metallic films on large substrates, there has been a large body of teaching relating to preparation of such coatings by electroless techniques which have developed from the art of the preparation of mirrors. Exemplary of such teachings are U.S. Pat. No. 3,457,138 to Richard G. Miller for the preparation of copper films and U.S. Pat. Nos. 3,672,939, 3,674,517 and 3,723,158 for the preparation of iron, cobalt or nickel films.

It has also been known in the past to prepare copper coatings on large substrates with the outer or exposed portion of the film oxidized so that a composite copper oxide/copper film results; see U.S. Pat. No. 3,537,944. The copper oxide coatings so produced are not found to provide for a variety of products having different characteristics which may be modified at will by simple control of the process for forming such coatings. Such coatings do not appear to have a sharp plane of demarcation between the copper oxide and the copper, but instead appear to have a gradual change from copper oxide to copper through their thickness and are not found adaptable for providing specific interference colors.

SUMMARY OF THE INVENTION

According to this invention, substrates, in particular transparent substrates such as glass, are provided with multiple coatings of copper, nickel and copper oxide in combination to provide the articles with selective reflectance and transmittance properties for radiation over an extended spectral range. At least three coating or film layers are required in accordance with this invention. One layer comprises copper or copper with small amounts of other metals, such as cobalt, nickel or iron. A second layer comprises nickel or nickel with small amounts of other metals, such as iron or cobalt. These two layers are metals substantially in a reduced metallic state. In each of these layers the metal may be present alone or in the presence of other ingredients, such as phosphorous or boron, present in small quantities as the result of chemical reduction, using compounds containing such elements as reducing agents for the metal comprising the principal constituent in the coating. Other impurities may also be present depending upon the particular method employed to apply the principal metal to the substrate or to the surface to which it is attached. Typically, tin or palladium may be present in small quantities within the metal coating layer adjacent the substrate. A third coating or film layer comprises copper oxide. This third layer of copper oxide is affixed to the described nickel metal layer.

While it is preferred that the copper metal coating be affixed to the substrate and the nickel metal layer affixed to it with the copper oxide coating disposed over the nickel layer, it is also possible to have the copper metal layer affixed to an underlayer adjacent to the substrate. The underlayer may be a metal, a metal oxide, silica or the like. Further, additional coating layers may be employed in some instances with alternate layers of metal oxide and metal films preferred but with the possibility of metal/metal oxide combinations in accordance with the preferred embodiments of this invention also being conveniently used in combination with other metal or metal oxide films. For example, a protective silica coating may be applied covering the exposed face of an outermost coating layer of metal or metal oxide.

The articles of this invention may be prepared using any convenient material as a substrate which is or may be made receptive to the deposition of the contemplated films. Substrates which may be useful for particular purposes include metals, porcelain, porcelain and enamel coated metals, refractory materials, glass and organic polymeric materials, such as plastics. Particularly useful articles are prepared for use as viewing closures utilizing glass as a substrate. While any known glass may be employed in this invention, the articles are preferably prepared utilizing common soda-lime-silica glasses. In particular, clear glass may be used as a substrate, although tinted and heat-absorbing glasses may also be used to advantage. A clear substrate, such as clear glass, is one which transmits light without substantial selective reflection or absorbtion so that the light received is transmitted at about the same color (hue) or dominant wavelength as received.

While the articles of this invention have a metal oxide layer as the exposed coated surface and have been found to be relatively durable, in some applications, it is preferred to employ the coated glass in a multiple glazed window unit with the coated surface facing the interior space between adjacent panels of such multiple glazed units. When employing such multiple glazed units in the wall of a building, it is preferred to position such units so that the coated glass is disposed towards the exterior of the building, for such an arrangement enhances the thermal isolation of the interior of the building from the external environment under general weather conditions.

The articles of this invention which comprise the aforementioned three coating layers on clear transparent substrates, such as clear glass, are gold in appearance, both to the eye and by spectrophotometric measurement. This is one of the principal advantages of this specific invention. In the past it has generally been necessary to make gold-appearing coatings by using metallic gold itself as the coating material. Due to the cost of gold, such coatings are quite expensive. Gold-appearing coatings made by copper or other metals other than gold have appeared as gold in reflection or transmission, but not both, or else they have not had the same ability as actual gold metal coatings to reject solar energy. The present three-layer coatings appear like gold metal coatings in transmission as well as reflection and are excellent rejectors of solar energy.

Quantitatively, the color of articles, according to this invention, may be expressed using the conventions of the conventional C.I.E. color system and using the parameters of reflectance, dominant wavelength, excitation purity and tristimulus values. By the quantitative techniques it is possible to appreciate how well the present coatings may be substituted for the more expensive gold metal coatings of the past.

The preferred three-layer coated articles according to this invention have the following quantitative color characteristics when the coating layers are disposed on a clear glass substrate. The articles have luminous transmittances (tristimulus Y) within the range of from 12 to 22 percent, transmittance dominant wavelengths within the range of from 575 to 580 nanometers and transmittance excitation purities within the range of from 44 to 54 percent. They have, in reflection from their films, luminous reflectances (tristimulus Y) within the range of from 35 to 50 percent, film reflectance dominant wavelengths within the range of from 490 to 500 nanometers and film reflectance excitation purities within the range of from 5 to 12 percent. They have, in reflection from their glass sides, luminous reflectances (tristimulus Y) within the range of from 35 – 55 percent, glass reflective dominant wavelengths within the range of from 570 to 585 nanometers and glass reflectance excitation purities within the range of from 12 to 35 percent.

Measurement of the characteristics of the articles of this invention is accomplished using a Beckman Model DK-2A Spectrometer. The "total solar" reflectance and transmittance are integrated values for response over the spectral range from 300 nanometers to 2100 nanometers. The "luminous" reflectance and transmittance are integrated values for response over the spectral range from 380 nanometers to 760 nanometers. Transmittance is expressed as the percent of light transmitted through the specimen tested compared with the light transmitted through air. Reflectance is expressed as the percent of light reflected from the specimen tested compared with the light reflected from a flat, white, magnesium oxide block.

Characteristics are determined according to responses calculated for illumination by standard Illuminants "B" and "C". Tristimulus Y or reflectance, dominant wavelength and excitation purity follow convention.

Considering the present invention in another aspect, a method is provided for preparing the multiple layer coated articles described which is readily applicable to the preparation of coated articles having large surface areas, for example, greater than 12 inches by 12 inches and even greater than 10 feet by 10 feet. The method for preparing such articles in accordance with this invention does not suffer from the problems attendant to the preparation of narrow band filters, such as taught in the prior art according to Dimmick and others, which require the deposition of films in a vacuum and require the close monitoring of desposition during the preparation of such articles. Such problems are also common to the method of preparing a copper/copper oxide composite film which is described above.

In its method aspect, this invention comprises a process having the following steps:

A substrate to be coated is cleaned and, if necessary, sensitized and surface-activated in a conventional manner to provide a surface receptive to coating.

A brown copper film is deposited on the receptive surface of the substrate by contacting it with a coppering solution containing a minute quantity of a triazole (on the order of from 3 to 10 ppm triazole).

A nickel film is deposited over the brown copper film by contacting it with a plating composition from which nickel may be reduced and deposited in a conventional manner.

Optionally, the nickel film is activated by contacting it with an activating composition of a nobel metal salt in a conventional manner for surface activation.

An ordinary copper film is deposited over the nickel film in a conventional manner by contacting it with a conventional coppering solution.

The outer copper film is treated with an absorbing surfactant which renders its surface hydrophobic upon drying. Then the treated surface is rinsed and dried.

Finally, the combination is heat treated at a sufficient temperature for a sufficient time to substantially oxidize the outer film of copper to copper oxide.

This invention may be further understood with reference to the appended drawings.

BRIEF DESCRIPTION OF THE DRAWINGS

FIG. 3 is a graphical presentation of the spectral properties of the article shown in FIG. 1.

DESCRIPTION OF THE PREFERRED EMBODIMENTS — ARTICLES

Figure 1:
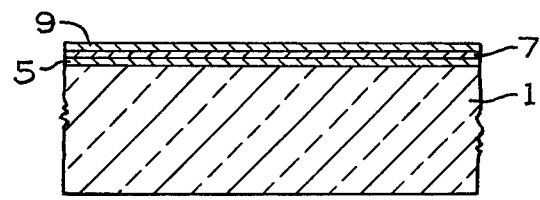
FIG. 1 is a cross-sectional view of a coated article according to this invention.

In the drawings, where like reference numbers indicate like elements, the articles of this invention are shown.

In FIG. 1 there is shown a section of a substrate (glass) 1 which is coated on a surface with a film of brown copper 5 overlaid with a film of nickel 7 and further overlaid with a film of copper oxide 9.

Figure 2:
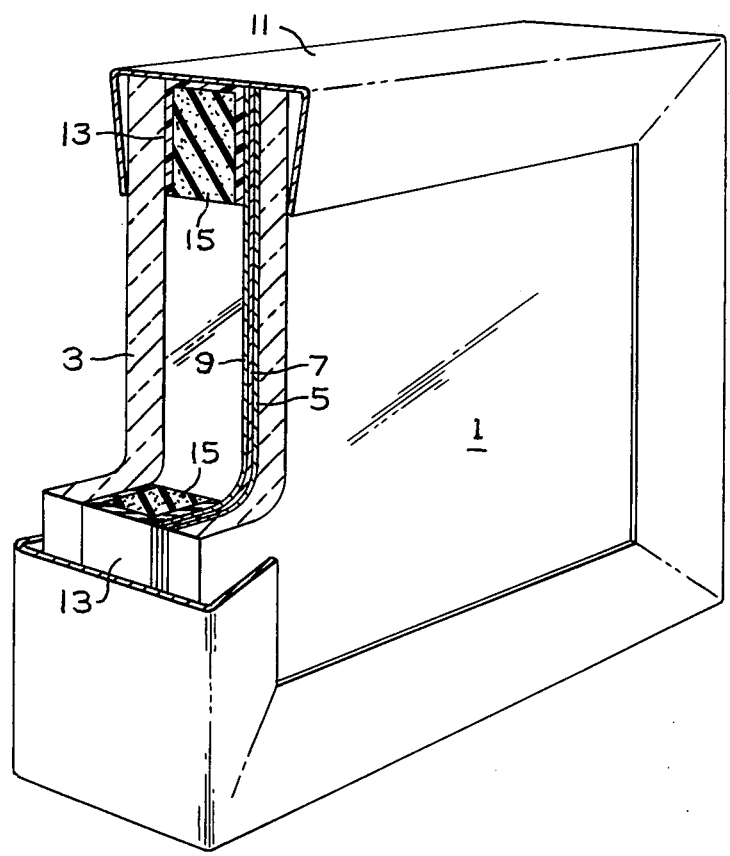
FIG. 2 is a broken perspective view of an insulating glass unit employing a coated glass plate in accordance with this invention.

In FIG. 2 there is shown a multiple glazed window unit employing a coated substrate such as illustrated in FIG. 1 as one of the window panels. That panel comprises a glass substrate 1 with its adherent film layers 5, 7 and 9 and that panel 1 is joined with a second window panel 3 by a peripheral frame 11 comprising channel segments. The combination of panels 1 and 3 and frame 11 is sealed by an adhesive or mastic 13 to a spacer 15 which maintains the panels 1 and 3 a sufficient distance apart to provide an insulating effect to the assembly. The spacer 15 may be a conventional rigid element or a compressible element as shown. The preferred spacer is a spacer-dehydrator made of moisture transmittable material with a dessicant dispersed through its matrix.

DESCRIPTION OF THE PREFERRED EMBODIMENTS — METHODS

The best method contemplated for preparing the articles of this invention follows. Prior to applying any coating to the glass surface, the glass surface is cleaned. If the glass to be coated has an imperfect coating which must be removed, the initial cleaning step comprises contacting the glass surface with a strong cleansing agent, such as those which are conventionally employed for cleaning glass. In particular, chromic acid and other strong acids may be used, although it is preferred to employ solutions of strong oxidizing agents such as peroxides, perborates or permanganates. This initial cleaning, if necessary, is followed by washing the glass with water. While tap water may be employed, it is preferable to use distilled, deionized or demineralized water. Following the wash, the glass surface is blocked or lightly abraded, using brushes or felt blockers along with a water mixture containing cerium oxide, silica or other common light abrasive materials. The glass is then again washed with water and rinsed clear.

The cleaned glass is then contacted with a sensitizing agent to make the glass surface receptive to the deposition of metal and to insure that deposited metal will adhere to the glass surface. The preferred method for sensitizing a glass surface comprises contacting the surface with a dilute aqueous solution of a tin salt. While any soluble or water-dispersible tin salt such as stannous bromide, stannous iodide or stannous sulfate may be employed, stannous chloride is a preferred source of tin. A stannous chloride solution having a preferred concentration of stannous chloride of from 0.01 to 0.1 grams per liter is employed, and a solution having a stannous chloride concentration of from 0.02 to 0.08 grams per liter has been found to be particularly useful. The tin solution may be sprayed or permitted to drip onto the glass surface or may be applied using any conventional contacting technique. Applying the solution from a pipe having orifices disposed along its length and allowing the solution to drip onto the glass or applying the solution from spray guns have both been found to be particularly simple and troublefree. Following contact of the glass with a tin solution, the glass is again rinsed with water. A variety of conventional techniques may be employed for spraying rinse water against the glass, although it has been found particularly beneficial to employ crossfire rinse applicators to direct the spray generally against the direction of glass travel on a conveyor while traversing the glass perpendicular to its direction of travel. Such an arrangement is the subject of the applicant's U.S. Pat. No. 3,793,054, which is incorporated herein by reference.

Following rinsing, the glass surface is contacted with a noble metal solution to further prepare the surface for receiving a coating. The preferred solution for employment in this step is a palladious chloride solution having a concentration of palladious chloride of from 0.005 to about 1.0 grams palladium chloride per liter of solution together with an equal amount of hydrochloric acid. This solution may be applied to the glass by techniques similar to those for application of the tin solution, such as spraying or dripping. Following contact of the glass with a palladium solution, the glass is again rinsed with a rinse water preferably applied using crossfire rinse applicators as before indicated.

Following the palladium treatment and its accompanying rinse, the glass is then contacted with a composition suitable for depositing a brown copper film onto the glass surface.

The treated glass surface is contacted with an aqueous alkaline copper filming solution containing a water-soluble or water-dispersible copper salt, a reducing agent, a triazole, preferably 3-amino-1,2,4 triazole and an alkaline pH control agent, and preferably also the salt of the metal selected from the group consisting of nickel and cobalt. The preferred copper solution comprises two solutions, which are described as concentrates which are diluted with water immediately before application. The first concentrate is a copper salt solution comprising a copper salt, such as copper sulfate, in an amount of from about 50 to 80 grams per liter. The second metal salt is nickel sulfate in an amount of from about 15 to 30 grams per liter, along with a reducing agent, such as formaldehyde, in an amount of from about 400 to 550 cc. per liter. The second concentrate comprises a pH control agent, such as sodium hydroxide, in an amount of from about 70 to 100 grams per liter and a Rochelle salt in an amount of from about 250 to 350 grams per liter. These concentrates are diluted with water in ratios of from about 1 part of copper solution to 1 part of Rochelle salt solution to 4 parts of water to about 1 part copper solution to 1 part Rochelle salt solution to 10 parts of water to provide relatively thick copper coatings suitable for oxidation. The preferred dilution ratio is from about 1:1:5 to about 1:1:8 and a dilution ratio of 1:1:6 is most preferred. The triazole is added gradually to the solution until the solution contains at least about two ppm triazoles which is about eight drops per 100 cc. of solution. The copper solution is applied by spraying or by dripping from a drip pipe as described above for tin application, although other application techniques, such as pouring or brushing, for example, might also be conveniently employed. Following contact of the article with this copper filming composition, the article may be rinsed with water and may then may be dried by warm or ambient air. At this point the article has a luminous transmittance on the order of 40 percent. The transmittance should be from 35 to 45 percent.

Following the deposition of the brown copper film, a nickel film is deposited onto the brown copper film.

Ordinarily, the copper film will remain wet after rinsing and until it is contacted by a nickel coating composition.

The preferred method for depositing nickel is that disclosed in commonly assigned U.S. Pat. No. 3,674,517, "Wet Chemical Method of Producing Transparent Metal Films," to R. G. Miller. Briefly, the nickel deposition step involves intermixing two separate solutions, one a nickel-containing solution, and another, a reducing solution containing a boron-containing reducing agent, and contacting the glass with the intermixed solution so that the reducing agent reduces the nickel, depositing it onto the glass. The preferred separate solutions are formulated as follows:

| | Nickel Solution |
|---|---|
| Nickelous acetate | 0.5 to 50 grams per liter |
| Boric acid | 0.5 to 35 grams per liter |
| Sodium gluconate | 1.0 to 75 grams per liter |
| Hydrazine sulfate | 0.1 to 5.0 grams per liter |
| Ammonium hydroxide | to adjust pH to 7.0 to 10.5 |
| Wetting agent | |
| Ethomeen C-20* | 0.01 to 1.0 grams per liter |

*Sold by Armour & Co. and consisting of:

$$R-N\begin{matrix}(CH_2CH_2O)_xH \\ (CH_2CH_2O)_yH\end{matrix}$$

where R is derived from cocoamine and $X + Y = 10$

| | Reducing Solution |
|---|---|
| Sodium borohydride | 0.1 to 25 grams per liter |
| Sodium hydroxide | to adjust pH to 10 to 12.5 |
| Wetting agent | |
| Ethomeen C-20* | 0.01 to 1.0 grams per liter |

*Sold by Armour & Co.

Preferably the two solutions are sprayed at equal rates so that the spray fans intersect at or near the surface of glass to be coated. After spraying the two solutions to intermix at the glass surface, the glass is conveyed from under the spray applicators and the reacting composition is allowed to remain as a puddle or pool on the top surface of the glass while deposition continues. The glass is then rinsed with water as before. The nickel deposition step may be repeated until the desired nickel-boron film thickness is attained as indicated by visible light transmittance or by any other convenient technique. Following a final rinse, the nickel-containing coating may be air-dried but preferably is allowed to remain wet.

The article may be dried at this point and its optical characteristics may be observed. The article typically has a luminous transmittance on the order of 25 percent at this point. The transmittance should be from 20 to 30 percent.

Following deposition of the nickel film, the article is again rinsed and the nickel film is contacted by a palladium activation solution as before.

The activated surface of the nickel film is then contacted by a coppering solution like that used before except for the absence of sufficient triazole to make a brown copper film. A conventional copper film is deposited onto the nickel film.

At this point, if the article is rinsed and dried, it has a luminous transmittance on the order of 4 percent. The transmittance should be from 2 to 8 percent.

Following this, the copper film is contacted with an aqueous solution containing an adsorbing surfactant. This surfactant solution preferably contains from about 0.05 to 5 percent by weight of surfactant and sorbitan monolaurate or a mixture of sodium carbonate, EDTA, fatty acid-ethoxylated adducts ethylene glycol and a sulfated quaternary ammonium compound sold by Fisher Scientific Co. under the name FL-70 are the preferred surfactants. The surfactant solution is applied by pouring, spraying or dripping, and may, after a short contact time, be rinsed from the plate with a water rinse. The article is then dried.

The coated article is then heated in an oxidizing atmosphere at a temperature above about 300° F (150° C), preferably between about 400° to 600° F (205° to 315° C), and most preferably about 425° F (220° C). The coated article is maintained at that temperature for a period from about 5 to 20 minutes, preferably about 15 minutes. This treatment results in a copper oxide film over a metallic nickel film over a brown copper film, all disposed on a glass substrate. The resulting article is observed to selectively reflect and transmit light. It is observed at this point to have a luminous transmittance on the order of from 12 to 22 percent and to have the appearance of a gold film on glass as described above. The spectral characteristics of the article are shown in FIG. 3. Preferred articles have transmittances of from 18 to 22 percent.

In summary, the following solutions may be employed to deposit the desired film layers and to prepare surfaces for receiving such film. An alternate coppering solution to that already described is shown.

| Tin Solution | Preferred | Preferred Range |
|---|---|---|
| Stannous chloride | 0.04 | .02 – .4 gram |
| Hydrochloric acid (12N) | 0.04 milliliter | .02 – .4 milliliter |
| Water | added to 1 liter | added to 1 liter |
| Palladium Solution | Preferred | Preferred Range |
| Palladious chloride | 0.02 gram | .02 – .04 gram |
| Hydrochloric acid (12N) | 0.04 milliliter | .02 – .04 milliliter |
| Water | added to 1 liter | added to 1 liter |
| Nickel Solution | Preferred | Preferred Range |
| Nickelous acetate | 5 grams | 4 – 10 grams |
| Boric acid | 2.5 grams | 2 – 5 grams |
| Sodium gluconate | 9.0 grams | 7 – 18 grams |
| Hydrazine sulfate | 0.5 grams | .4 – 1.0 grams |
| Water | added to 1 liter | |
| Ammonium hydroxide | added to pH 7.2 | pH 7.0 – 7.6 |
| Ethomeen C-20* | 1 drop per liter of solution | 0 – 2 drops |
| Acetone | .01 gram | 0 – 100 grams |
| *Sold by Armour & Co. | | |
| Reducer Solution | Preferred | Preferred Range |
| Sodium borohydride | 0.5 gram | .4 – 1.0 grams |
| Water | added to 1 liter | added to 1 liter |
| Sodium hydroxide | added to pH 11.5 | pH 11 – 11.6 |
| Ethomeen C-20* | ½ drop per liter | 0 – 2 drops |
| *Sold by Armour & Co. | | |
| Copper Solution | Preferred | Preferred Range |
| Water | 1 liter | 1 liter |
| Copper sulfate | 12.5 grams | 8 – 15 |
| Ethylene diamine tetraacetic acid | 18.6 grams | 15 – 25 |
| Sodium borohydride | 0.5 gram | 0.4 – 1.0 |
| 3-amino-1,2,4 triazole | 5 ppm* | 3 – 10 ppm* |
| pH (adjusted with NaOH) | 11.2 | 11.0 – 11.5 |

*None is present for making the second copper film since that film is to be oxidized.

Although this invention has been described with reference to specific embodiments, those skilled in the art will appreciate that variations may be made from these embodiments without departing from the spirit of the invention or from its scope as defined by the appended claims.

I claim:

1. In a method of making a coated article comprising the steps of:
   preparing a surface of a substrate to be coated and depositing a copper film onto the prepared surface of the substrate by contacting it with a copper plating solution comprising a copper salt and a reducing agent, the improvement which comprises a. adding to said copper plating solution an amount of a triazole sufficient to render the film brown in appearance;
b. depositing a nickel film onto the brown copper film by contacting it with a nickel plating solution comprising a nickel salt and a reducing agent;
c. depositing a copper film onto the nickel film by contacting it with a copper plating solution comprising a copper salt and a reducing agent;
d. contacting the copper film which has been deposited onto the nickel film with a surfactant which is capable of rendering the surface hydrophobic upon drying; and
e. heating the substrate and its three films to a temperature of at least about 300° F. (150° C.) in an oxidizing environment for a sufficient time to oxidize the copper film deposited onto the nickel film.

2. The method according to claim 1 wherein said triazole is 3-amino-1,2,4 triazole.

3. The method according to claim 1 wherein the substrate is glass and wherein the first copper deposition is carried on until the luminous transmittance of the article based upon a clear substrate is from 35 to 45 percent, the nickel deposition is carried on until the luminous transmittance of the article based upon a clear substrate is from 20 to 30 percent, the second copper deposition is carried on until the luminous transmittance of the article based upon a clear substrate is from 2 to 8 percent and following the oxidation step the luminous transmittance of the article based upon a clear substrate is from 12 to 22 percent.

4. The method according to claim 1 wherein the nickel film is activated by contact with a noble metal composition prior to the second copper deposition step.

5. An article of manufacture comprising a glass substrate coated with three layers of film, a brown copper layer affixed to the glass, a nickel layer affixed to the brown copper layer and a copper oxide layer affixed to the nickel layer, said article prepared according to the method of claim 1.

6. A transparent article of manufacture for the selective reflection of radiation over an extended spectral range comprising in combination:
a. a clear glass substrate
b. at least three coating layers affixed to a surface of said clear glass substrate:
1. a brown copper layer consisting essentially of copper deposited onto the glass in the presence of a triazole;
2. a copper oxide layer made by depositing copper and then oxidizing it; and
3. a nickel layer sandwiched between the brown copper layer and the copper oxide layer wherein the layers have respective thicknesses sufficient to provide the article with a luminous transmittance of from 12 to 22 percent a transmittance dominant wavelength of from 575 to 580 nanometers, a transmittance excitation purity of from 44 to 54 percent, and, from the glass side, a luminous reflectance of from 35 to 55 percent, a reflective dominant wavelength of from 570 to 585 nanometers and a reflective excitation purity of from 12 to 35 percent.

* * * * *